May 10, 1966  F. G. MALONEY  3,250,343
ORCHARD WORKING EQUIPMENT
Filed Dec. 3, 1963  5 Sheets-Sheet 1

Frederick G. Maloney,
INVENTOR.
WHANN & McMANIGAL
Attorneys for Applicant

Frederick G. Maloney,
INVENTOR.

WHANN & McMANIGAL
Attorneys for Applicant

May 10, 1966 F. G. MALONEY 3,250,343
ORCHARD WORKING EQUIPMENT
Filed Dec. 3, 1963 5 Sheets-Sheet 4

Frederick G. Maloney,
INVENTOR.
WHANN & McMANIGAL
Attorneys for Applicant
by

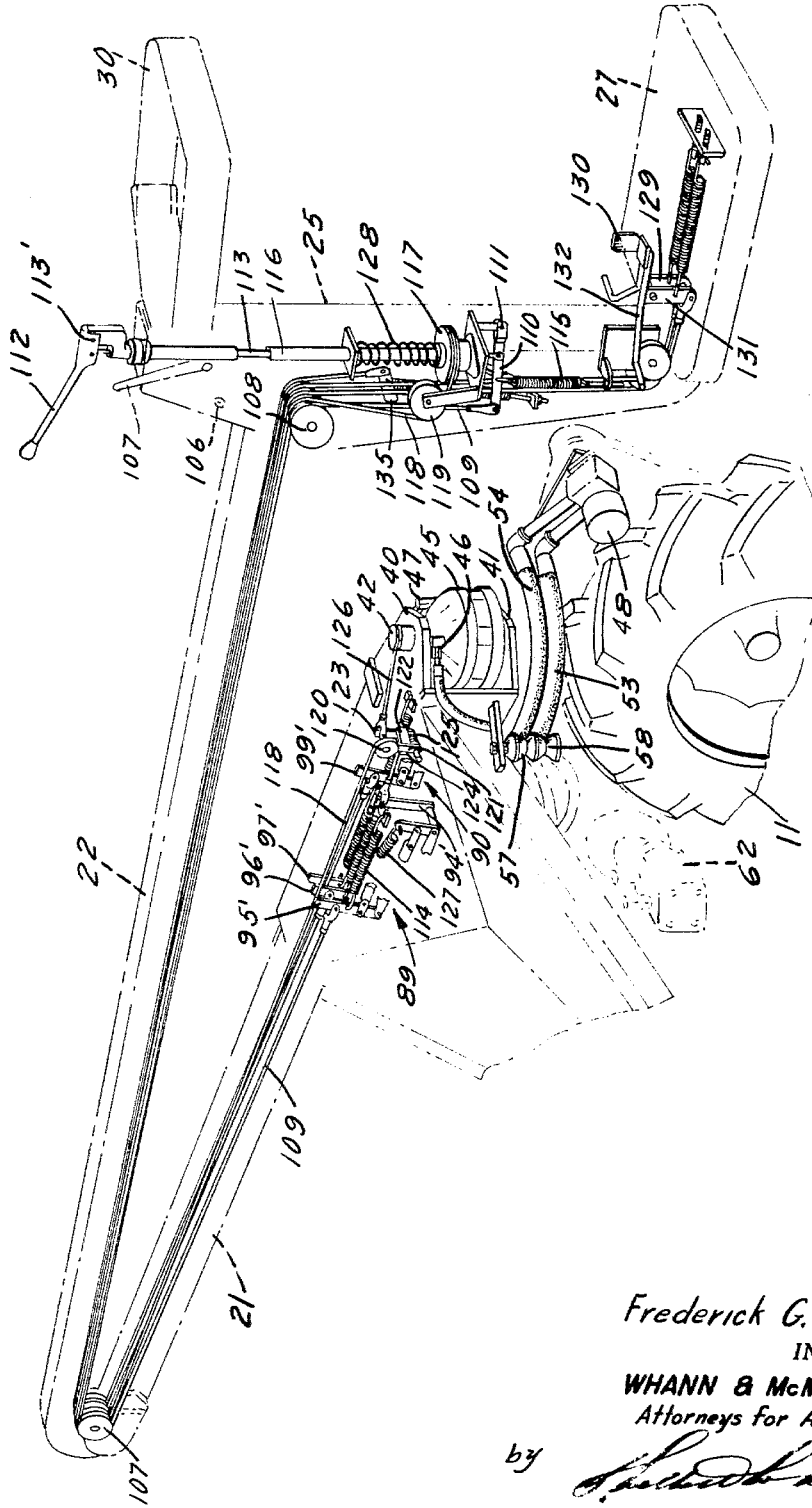

United States Patent Office 3,250,343
Patented May 10, 1966

3,250,343
ORCHARD WORKING EQUIPMENT
Frederick G. Maloney, Yakima, Wash., assignor to Edwards Equipment Company, Yakima, Wash., a corporation of Washington
Filed Dec. 3, 1963, Ser. No. 327,758
7 Claims. (Cl. 182—14)

The present invention relates generally to a mobile vehicle having a movable elevated platform by means of which a workman may be efficiently and safely placed in and moved to various elevated working positions above the ground; and is more specifically concerned with highly maneuverable equipment of this type embodying features which are particularly to be desired for working in trees and orchards.

Heretofore, a number of different arrangements have been utilized in the design of equipment for the above noted purposes. In the main, the present machines utilize a boom carried cage or platform which may be raised and lowered to change the elevated positions of the workman. For lateral movements of the workman, resort is usually had to either lateral swinging movements of the boom or a combination of such movement with limited guided movements of the vehicle. In general, the present devices have had the inherent disadvantage of placing the workman in various relative positions with respect to the vehicle so that the motions utilized to move the workman has resulted in a very complex and bewildering situation which interferes with efficient and effective maneuvering of the workman's position.

Having in mind the inherent disadvantages of present equipment, it is one object of the present invention to provide equipment of the foregoing character in which the operator's cage and working platform will be located substantially above the guided end or guide wheel of the vehicle, to the end that the movements of the operator and vehicle will be coordinated in direction and distance, thus simplifying the problem of getting from one working position to another, particularly with respect to movements horizontally with respect to the ground surface.

Equipment for the purpose described herein must necessarily provide operator control of the essential movements of the boom and vehicle from the operator's cage and working platform, and to be most effective this equipment must be simple to operate and readily accessible to the operator.

It is a further object to provide improved remote control wherein hydraulically energized power devices on the vehicle may be controlled by valves which are remotely operable from the operator's cage by the expedient of flexible pull cables.

Another object is to provide novel steering mechanism in which a vehicle guide wheel may be steeringly controlled from the operator's cage by means of a steering lever and servo-mechanism which is so arranged that the angular position of the steering lever corresponds with the angle of the steering wheel. The operator thus at all times is visually apprised of the guided movement path of the vehicle, and by having the operator's cage substantially directly over the guiding wheel, the direction and distance of movement of the operator will correspond with that of the vehicle.

It is also an object of the present invention to provide a vehicle in which the frame structure is arranged to permit the mounting of and carrying of a bulk bin between the rear wheels of the vehicle.

Still another object is to provide in connection with equipment according to the present invention a fork-lift mechanism which can be built into the frame structure of the equipment or provided as a removably attached unit for handling and supporting a bulk bin between the rear wheels of the equipment.

Further objects of the invention will be brought out in the following part of the specification, wherein detailed description is for the purpose of fully disclosing the invention without placing limitations thereon.

Referring to the accompanying drawings, which are for illustrative purposes only:

FIG. 6 is an enlarged fragmentary perspective view with parts shown in phantom, and diagrammatically showing the control connections with remotely operable elements on the operator's cage; and FIG. 7 is a diagrammatic view of the hydraulic system of the equipment.

Figure 1:
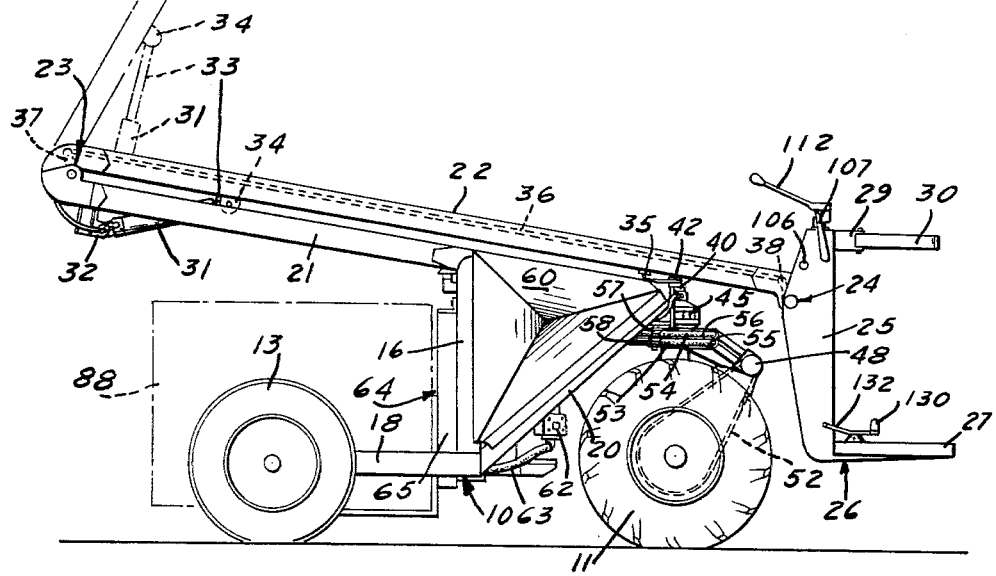
FIG. 1 is a side elevational view of equipment according to the present invention in which the lowered position of the boom and associated operator's cage are shown in fully lowered position in full lines, and in raised extended position in dotted lines.

Referring more specifically to the drawings, for illustrative purposes, the equipment of the present invention is shown as being embodied in a mobile wheeled vehicle in which a main frame structure as broadly designated by the numeral 10 is supported by a three wheeled arrangement consisting of a single front drive and guiding wheel 11 and rear wheels 12 and 13.

More specifically, the main frame structure 10 is constructed with an essentially triangular upstanding framework which extends transversely at a substantially intermediate position between the front wheel 11 and the rear wheels 12 and 13 of the main frame structure. This framework includes a main base beam 14 with inwardly sloping side frame members 15 and 16 in converging relation to form the apex of the framework. From the ends of the base beam 14, lateral frame members 17 and 18 extend rearwardly and form supports respectively for the rear wheels 12 and 13 which are rotatably supported at the outer ends of these members. Forwardly of the framework, the main frame structure includes side frame members 19 and 20 which slope upwardly and forwardly from the ends of the base beam 14 and converge at a point forwardly positioned of the intermediate framework.

At the points of convergence of the side frame members 15 and 16 and side frame members 19 and 20, these members are structurally secured to a ridge beam 21 of hollow construction. As shown in FIG. 1, the ridge beam 21 is rearwardly upwardly inclined, and is of a length such that its after end extends rearwardly beyond the rotational axes of the rear wheels.

The ridge beam forms a support for an elongate tubular boom 22 which is hingedly connected by hinge means 23 to the after end of the beam 21. In lowered position of the boom 22, as shown in FIG. 1, the free end of the boom extends slightly forwardly of the drive and guiding wheel 11, and is pivotally connected at 24 with a main frame 25 of box-like construction of an operator's cage as generally indicated by the numeral 26. The lowermost end of the box-like frame 25 supports a platform 27 upon which the operator stands. At the uppermost end of the frame 25, there is provided a transversely extending strap which forms lateral wings 28 and 29 to which there is connected a safety strap 30.

The boom 22 is raised and lowered by a power device, in this case a hydraulic cylinder 31 which is connected at its closed end to a bracket 32 at the rear end of the ridge beam 21, the hydraulic cylinder containing a piston which is connected through a piston rod 33 with a connection lug 34 carried by the boom 22. When the piston rod is in retracted position, the boom 22 is lowered into substantially parallel relation with the ridge beam and in this position may rest upon a pad support 35 at the forward end of the frame structure. In extended position of the piston rod, the boom may be raised to a desired position, and in full extended position moves the boom 22 to the position shown in dotted lines in FIG. 1. During this movement of the boom, the operator's cage 26 has its swinging movement on the hinge connection 24 stabilized by means of an elongate rod 36 which is pivotally connected at one end with a fixed bracket arm 37 carried by the ridge beam, and at its other end to a fixed bracket arm 38 carried by the frame 25 of the operator's cage. The rod 36 is housed within the boom 22 and is thus protected against damage by overhanging tree branches or other structures.

Figure 2:
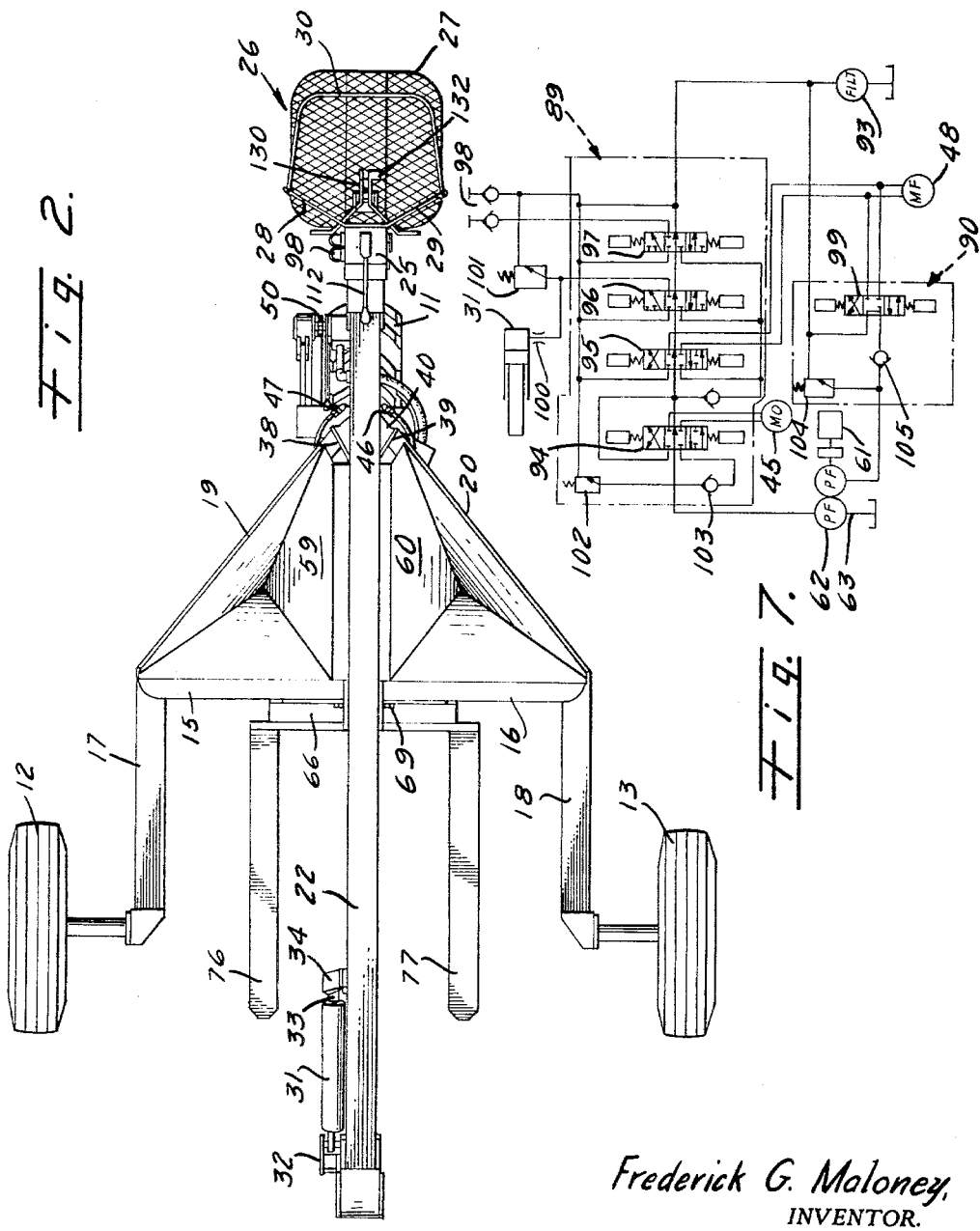
FIG. 2 is a plan view.

The drive and guiding wheel 11 is operatively supported in the forward end of the ridge beam 21. The end side walls are defletced outwardly to provide diverging end portions 38 and 39 (FIG. 2) which are interconnected by spaced upper and lower plate members 40 and 41 which serve as supports for suitable bearings for a rotatable axle 42. The lowermost end of the axle is secured to a leg 43 of an inverted L-shaped wheel supporting bracket in which the other leg 44 extends alongside the wheel 11 and has the wheel axle secured thereto. Guiding movements of the wheel are obtained by rotating the axle 42 by means of a suitable power device. For this purpose, a hydraulic steering actuator 45 is positioned between the plate members 40 and 41 in concentric coupled relation with the axle 42. Fluid connections to the actuator are indicated by the numerals 46 and 47.

Driving power is supplied to the wheel 11 from a hydraulic drive motor 48 which is supported upon a mounting bracket structure 49 in a position forwardly of the wheel supporting bracket. The drive shaft of the motor 48 carries a drive sprocket 50 which is drivingly coupled with a wheel sprocket 51 by means of a chain 52. Hydraulic connections with the drive motor 48 are provided by flexible hoses 53 and 54 which are retained in arcuate guiding grooves 55 and 56 by means of retaining rollers 57 and 58 during guiding movements of the wheel 11.

The main power plant of the equipment is mounted in the main frame structure forwardly of the intermediate framework, and is protected by hinged covers 59 and 60 which are positioned on opposite sides of the ridge beam and provide ready access to the various components of the power plant.

The main power plant includes a conventional gasoline engine as generally indicated by the numeral 61, and which is drivingly coupled with a fixed displacement, vane type, double pump 62 which in the present instance is rated to deliver from one section a low capacity flow of the order of 1.6 g.p.m., and from the other section a high capacity flow of the order of 4.7 g.p.m. at substantially 1000 p.s.i. Fluid for the hydraulic system is stored within the frame structure members which serve as a supply tank, and from which fluid is supplied through a delivery connection 63 to the pump.

Figure 3:
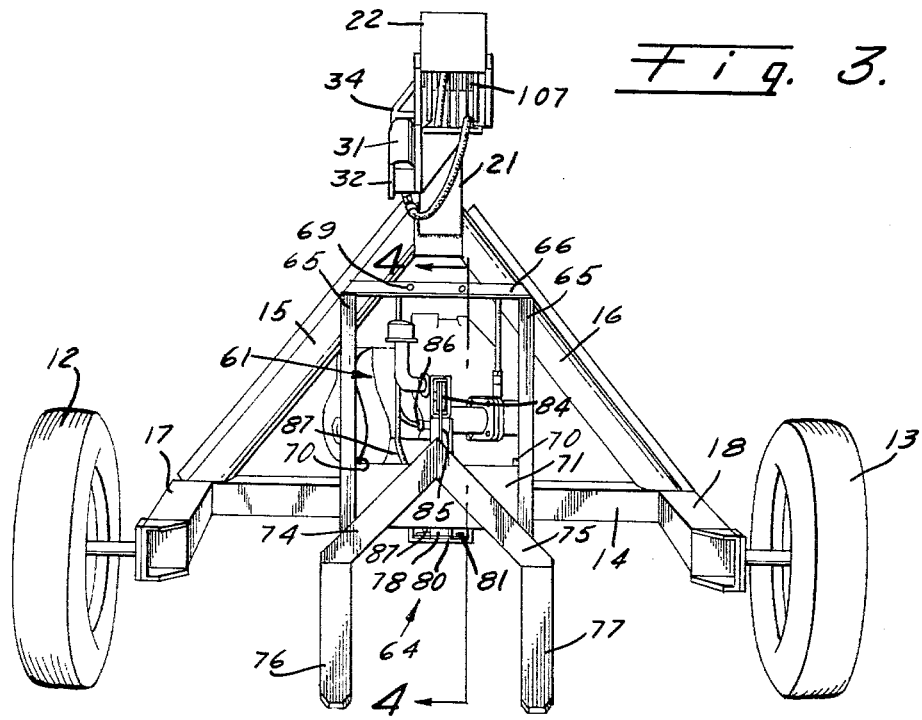
FIG. 3 is a rear elevational view showing details of the fork-lift mechanism.

Use of the equipment of the present invention in connection with orchards is materially enhanced by providing the spaced wheel structure as previously described so that a bulk bin may be supported between the rear wheels. For this purpose, there is provided a fork-lift mechanism as generally indicated by the numeral 64, and as clearly shown in FIGS. 3 and 4. The fork-lift mechanism may be provided as an initial adjunct to the equipment, or may be provided as a removable attachment as shown in the embodiment of the invention described herein. The lift mechanism comprises a mast structure composed of laterally spaced confronting channels 65—65 which are welded or otherwise secured at their uppermost ends to a top angle member 66, and adjacent their lowermost ends to an angle member 67 which is adapted to rest upon the base beam 14 of the main frame structure and support the mast when the upper angle member 66 is clampingly associated with a clamping bar 68. Clamping bolts 69 secure the angle member 66 and clamping bar 68 in clamped relation with the adjacent side frame members 65 and 66.

Figure 4:
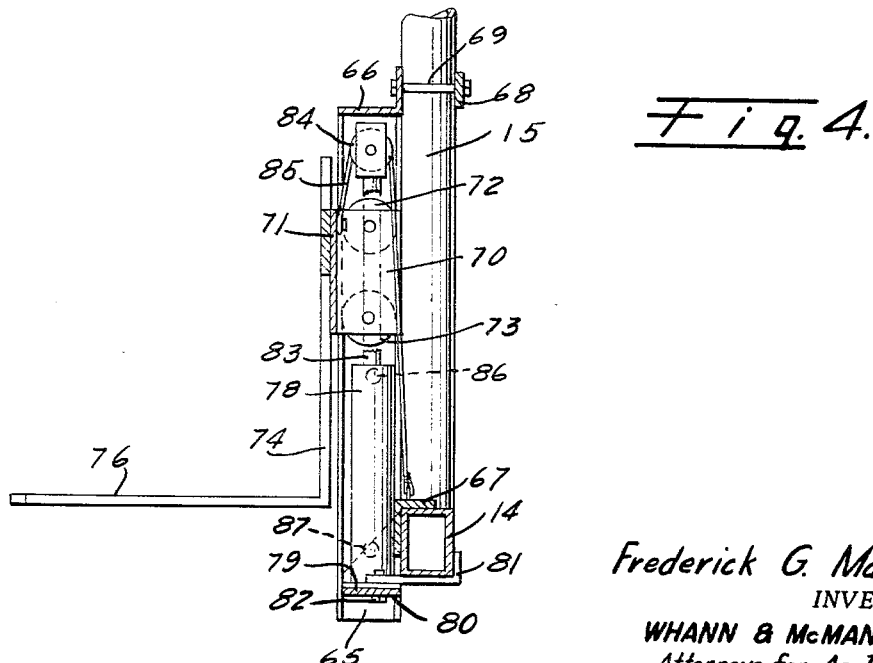
FIG. 4 is an enlarged fragmentary sectional view, taken substantially on line 4—4 of FIG. 3, to show the operative relationship between parts of the fork-lift in raised position.

A carriage structure is supported in the channels 65—65 for raising and lowering movements, and consists of end plates 70—70 which overlie the open sides of the channels and are welded or otherwise secured to a cross plate 71. Each of the end plates, as shown in FIG. 4 is provided with an upper roller 72 and lower roller 73 which are adapted to move in the associated channel and support the carriage structure in its operative position. A frame composed of elongate members 74 and 75 connected in downwardly diverging relation is welded or otherwise connected to the cross plate 71. The lowermost ends of the member 74 and 75 project outwardly beyond the mast structure and are respectively secured to rearwardly extending finger members 76 and 77 which cooperate to form a fork-lift.

The carriage structure is raised and lowered by means of a hydraulic lift cylinder 78, this cylinder being secured at its lowermost end to a plate member 79 adapted to engage a cylinder supporting cradle 80 which is secured to the angle member 67. The cylinder 78 and the lowermost end of the mast structure are held in mounted position against displacement from the base beam 14 by means of hook clamp members 81 placed on opposite sides of the cylinder 78 and secured to the plate 79 and bottom of the cradle 80 by means of securing bolts 82. Associated with the cylinder 78 is a piston which is connected with a piston rod 83 which carries a rotatably mounted pulley 84 at its outermost end. A lifting cable 85 is trained over the pulley 84, one of this cable being attached to the carriage structure, and the other end being anchored to the angle member 67 or other fixed portion of the mast structure. The cylinder 78 is double acting and has end fluid connections as indicated by the numerals 86 and 87.

The finger members 76 and 77 may be utilized to support a bulk bin 88 as shown in FIG. 1 in dotted lines between the rear wheels, and by manipulation of the lifting fork mechanism, the bulk bin may be raised and lowered to facilitate handling thereof.

Provision is made for complete control of the vehicle and change in the operator's position by providing selective remote control devices in the operator's cage, these devices being located for easy and convenient access, and being so designed as to be coordinated with the movements of the vehicle and the operator, and as in the case of the steering devices to indicate to the operator the direction of guiding movement of the vehicle. Valve means are positioned adjacent the hydraulic power devices with which they are associated, and novel remote control assemblages provided as will hereinafter be explained.

The various operation functions of the equipment are controlled by means of a four spool valve 89 and a single spool valve 90, these valves being arranged to exhaust through hoses 91 and 92 and by a common filter 93 into the framework storage for the hydraulic fluid.

The valve spools are of the open center type and are spring centered as schematically illustrated in FIG. 7.

The four spools of the valve 89 are arranged as follows: Spool 94 is a four-way, series valve and controls the steering actuator 45. Spool 95 is also a four-way reversing type of valve, and is utilized for directing flow from the low capacity section of the pump to the driving motor 48. Spool 96 is a three-way valve and controls the boom lift cylinder 31. Spool 97 similarly is a three-way valve for controlling flow to coupling outlets 98 for supplying operating fliud to auxiliary or attachment circuits and devices.

Valve 90 has a single spool 99 which is four-way and is utilized to control flow from the high capacity pump section to the drive motor 48. This spool provides a higher drive speed than the flow controlled by spool 95 of valve 89. With valve spool 95 and valve spool 99 both connected to the drive motor 48, it is possible by actuating both valve spools at the same time, to combine the flows from both pump sections to give a third and higher speed.

The boom lift cylinder speed is controlled by a fixed orifice 100 to protect the operator from sudden drops. A relief valve 101 is incorporated in the fluid supply line to limit the lifting force to approximately 80 pounds greater than necessary to lift the operator. This prevents damage to the operator or machine when coming up under a heavy tree branch or other object. The system pressure is limited to 1500 p.s.i. by a relief valve 102 and check valve 103 associated with the valve 89, and a similarly arranged relief valve 104 and check valve 105 associated with the valve 90.

Figure 5:
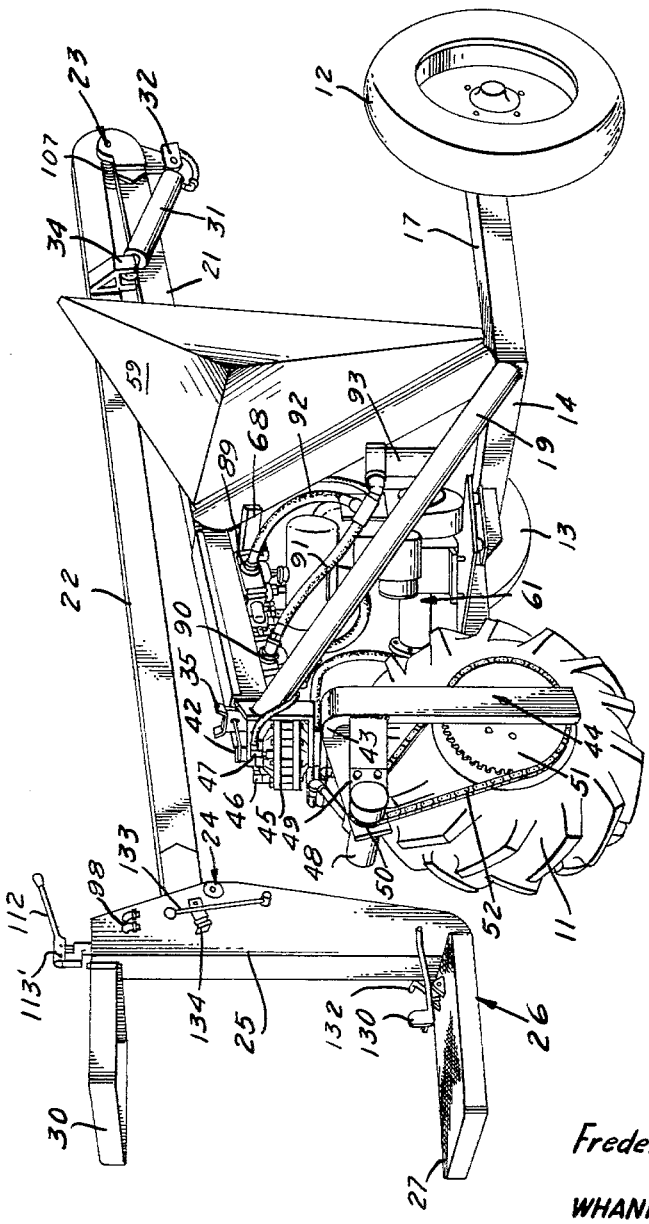
FIG. 5 is a perspective view for showing details of the driving and guiding means at the front end of the vehicle.

The valve spools are respectively operable by corresponding operating levers 94', 95', 96', 97' and 99'. As shown in FIG. 5, the valves 89 and 90 are supported immediately below the ridge beam 21 in the engine compartment, thus permitting the respective operating levers to extend upwardly to the interior of the ridge beam, as diagrammatically illustrated in FIG. 6. Thus by mounting the control valve assemblies adjacent the power devices which they control and by keeping them close to the supply pumps, the efficiency is maintained at a high level.

Remote control from the operator's cage will now be described in detail. The engine key start switch is indicated by the numeral 106 and is mounted on a side wall at the upper end of the box-like frame 25. Adjacent this switch, there is provided a throttle control lever 107 which is connected to a conduit type push-pull cable having connection with the carburetor of the engine.

For controlling the respective valve spools of the valve assemblies 89 and 90, a unique arrangement is provided for actuating the spool operating levers in opposite directions through flexible cables which are carried through the hollow boom 22 and the ridge beam 21, these cables being carried around ball bearing mounted pulleys 107 at the hinge means 23 and pulleys 108 at the hinge connection 24, as diagrammatically shown in FIG. 6. By locating the axes of rotation of the pulleys on the hinge axes, no lenthening or shortening of the cables results from elevating the boom.

Since the manner of operation of each valve spool is accomplished in a similar manner from the remote operating position in the operator's cage, it is believed that the unique operating linkage utilizing flexible cables will be clearly understood by considering the operation of one valve spool, for example, the valve spool 95 of the valve assembly 89 which is utilized for the forward and reverse low speed drive. In this case, the operating lever 95' is connected by means of a flexible cable 109 to the outermost end of a lever 110 having its other end pivotally supported at 111 for swinging movement. Associated with the lever 110 is a lever 112 which can be operated by the operator in the cage. The lever 112 is supported for vertical swinging movement on a pivot 113' and is connected between its ends with an inner end point of the lever 110 by means of a connecting rod link 113 so that raising and lowering movements of the handle lever 112 will be reflected in similar movements of the lever 110. As previously stated, the valve spools are self-centering by associated centering springs. According to the present invention, a tension spring 114 is connected to the operating lever 95', and a similar tension spring 115 is connected to the lever 110 in the operator's cage, These two springs place the connecting cable 109 under tension at all times of operation of the valve spool 95, and since the springs 114 and 115 are in balanced relation at the centered position of the valve spool, a smooth positive actuating control is established between the remote station and the local valve assemblies which is free of slack and backlash. In the case of the hand lever 112 it will be possible by raising and lowering movements to connect the driving motor 48 to the low capacity pump for selective forward and reversed operations in a creeping speed range.

The hand lever 112 is also utilized for steering control. For this purpose, the same principles of operation are utilized as previously described for operating the operating lever 95'. For steering the hand lever 112 is utilized, and for this purpose the lever has its pivotal support 113' connected with a rotatable tubular shaft 116 which carries a cable drum 117. In this case a flexible cable 118 is utilized, the remote end of the cable being trained over an idler guide pulley 119 and carried around the drum 117. The other end of the cable 118 is carried around an idler pulley 120 and connected at its end with the operating lever 94' for the valve spool 94. The idler pulley 120 is supported on a pivoted bracket 121 which carries a projecting stop 122. The pivoted bracket 121 is associated with an adjacent lever arm 123 which is supported upon the same pivotal axis as that of the bracket 121. The lever arm 123 carries a projecting stop member 124 which is adapted to engage the bracket 121, when the lever arm 123 is rotated clockwise into engagement with the stop member 122 carried by the bracket. A coiled spring 125 is positioned with its ends respectively in engagement with the stops 122 and 124, this spring normally acting to move the stops away from each other. The outermost end of the lever arm 123 is connected through a servo-cable 126 with the steering axle 42 by wrapping an end of the cable around the axle. The idler pulley 120 and the lever 123 acting through the servo-cable provide a slack pickup means which will work with the valve spool 94 to provide a servo-mechanism for controlling the hydraulic steering actuator 45, and wherein the horizontal angular position of the hand lever 112 will indicate the direction of the guiding position of the wheel 11. Main cable tensioning springs are also provided in this case. For the operating lever 94', a coil spring 127 is provided, and for the cable drum 117 a spiralled spring 128 is provided, one end of this spring being connected to the drum and the other end being fixedly anchored.

Similarly operating remote controls are provided for the functions performed by the valve spools which are operated by the operating levers 96', 97' and 99'. At the remote operator's cage, a lever 129 is arranged to be operated by a foot treadle 130 on the cage platform to control the boom lift operating lever 96'. A similar lever 131 and foot treadle 132 are arranged to control the operating lever 99' for the drive control spool 99.

For controlling the auxiliary coupling outlets 98, a hand lever 133 is swingably mounted on a side surface of the box-like frame 25 of the operator's cage, as shown in FIG. 5. This lever is arranged to be moved to a latching position as determined by a latch member 134, in which position the lever will be held in a position in which the associated valve spool will be continuously open to supply the auxiliary outlets. The lever 133 is connected with a crank member 135 as shown in FIG. 6, this crank member having connection with the connecting cable which leads to the operating lever 97' for the valve spool 97.

When utilizing the fork-lift mechanism as previously described, the supply hoses leading to the coupling outlets 98 may be disconnected and connections made to supply fluid to the fluid connectors 86 and 87 of the cylinder 78 of the fork-lift mechanism. In this case, the hand lever 133 would control the operation of the fork-lift mechanism.

Various modifications may suggest themselves to those skilled in the art without departing from the spirit of my invention, and, hence, I do not wish to be restricted to the specific form shown or uses mentioned, except to the extent indicated in the appended claims.

I claim:

1. Equipment of the character described, comprising: a wheeled vehicle including a frame structure; a remotely positioned operator's cage; pivotally connected boom means movably connecting said cage and said frame structure; mechanism carried by said frame structure including an energizable power actuating device; local control means on the frame structure for controlling the energization of said device including an actuator selectively movable in opposite directions from a neutral position; a manually operable remote control member at the operator's cage selectively movable in opposite directions from a neutral position; a single run flexible cable connection between said remote control member and said local control means actuator, said flexible cable being trained along said boom means and about a point adjacent the pivotal connection of said boom means; and tension springs respectively positioned at said control member and said local control means actuator for maintaining said flexible cable under opposing balancing tension forces at said neutral positions of the remote control member and the local control means actuator, whereby movement of the former in either direction from its neutral position will be transmitted to the latter and correspondingly move it with respect to its neutral position.

2. Equipment of the character described, comprising: a power driven wheeled vehicle including a frame structure having at least one forward guide wheel, the frame structure further having in its rearward end portion a transversely extending upstanding framework, a pair of lateral spaced apart frame members extending rearwardly from said framework and providing supports for rear wheels respectively at their outermost ends; a fork-lift mechanism supported on said framework including a carriage supported for raising and lowering movements, said carriage having rearwardly extending horizontal arms positioned in the space between said lateral frame members, whereby a bulk bin may be supported between the rear wheels; actuator means operable to raise and lower said carriage; and a movably mounted boom structure carried by said frame structure, said boom structure being vertically swingable about a pivot at one end in an elevated position above said rear wheels and having an operator's cage at its outer end arranged to be adjustably positioned generally above the guide wheel.

3. Equipment of the character described, comprising: a power driven wheeled vehicle including a frame structure having at least one forward guide wheel, the frame structure further having in its rearward end portion a transversely extending upstanding framework, a pair of lateral spaced apart frame members extending rearwardly from said framework and providing supports for rear wheels respectively at their outermost ends; a fork-lift mechanism supported on said framework including a carriage supported for raising and lowering movements, said carriage having rearwardly extending horizontal arms positioned in the space between said lateral frame members, whereby a bulk bin may be supported between the rear wheels; actuator means energizable to raise and lower said carriage; a movably mounted boom structure carried by said frame structure, said boom structure being vertically swingable about a pivot at one end in an elevated position generally above said rear wheels and having an operator's cage at its outer end arranged to be adjustably positioned generally above the guide wheel; power means energizable to raise and lower said boom structure; and means for selectively controlling the energization of said actuator means and said power means including remote controls on the operator's cage.

4. Equipment of the character described, comprising: a wheeled power driven vehicle including a frame structure having a guiding wheel supported thereon for guiding angular movements; an operator's cage positioned above said wheel, carried by a boom operatively mounted on said frame structure; an angularly movable steering member in the operator's cage; a servo-mechanism including a power device for selectively angularly moving said guiding wheel to guiding positions and control connections between said steering members and said servo-mechanism including means for coordinating the guiding positions of the guide wheel to that of the steering directions as indicated by the physical positions of said steering member.

5. Equipment of the character described, comprising: a wheeled vehicle including an elongate frame structure having a front drive wheel supported for guiding angular movements about a vertical axis; an operator's cage positioned generally above said wheel, carried by a boom operatively mounted on said frame structure; a control level in the operator's cage supported for raising and lowering movements from a neutral position, and horizontal swinging steering movements in opposite directions; power means for driving said drive wheel; a power actuator for guidingly angularly moving said drive wheel in opposite directions; and control means on the frame structure selectively operable from a neutral position responsive to the raising and lowering movements of said control lever for controlling the direction of rotation of said driving power means, and to the steering movements of the lever to control the guiding movements of the drive wheel by said power actuator and set the guiding angle of the wheel so as to correspond with the angular horizontal position of said lever.

6. Equipment of the character described, comprising: a wheeled power driven vehicle including a frame structure having a guiding wheel supported thereon by a vertical rotatable axle for guiding angular movements; an operator's cage positioned above said wheel, carried by a boom operatively mounted on said frame structure; steering means including a horizontally swingable steering level and connected cable drum; a power actuator for rotating said axle to guidingly move said wheel; valve means on said frame for controlling said power actuator, said valve means having an actuator lever supported for selective movements in opposite directions from a neutral position; a connecting cable extending along said boom, one end of said cable being wound on said cable drum and the other end being connected to said actuator lever; oppositely acting spring means associate respectively with said lever and said drum for maintaining said connecting cable under tension; cable slack adjusting means including a movably supported idler pulley having said connecting cable trained thereover; and means including a servo-cable wound on said shaft and connected with the support of said idler pulley to vary its position in a direction to return said actuator lever to neutral position in response to an initiating change in the guiding direction of the guide wheel, whereby the guiding position of said wheel will correspond with the steering position of said lever.

7. Equipment of the character described, comprising: a wheeled power driven vehicle including a frame structure having a guiding wheel supported thereon by a vertical rotatable axle for guiding angular movements; an operator's cage positioned above said wheel, carried by a boom operatively mounted on said frame structure; steering means including a steering lever and connected cable drum; a power actuator for rotating said axle to guidingly move said wheel; valve means on said frame for controlling said power actuator, said valve means having an actuator lever movable in opposite directions from a neutral position; a single connecting cable extending along said boom, one end of said cable being wound on said cable drum and the other end being connected to said actuator lever; oppositely acting spring means associate respectively with said lever and said drum for maintaining said connecting cable under tension; therebetween and permitting initiation of movement of said actuator lever selectively by said steering lever in one direction of the other from said neutral position; and means for controlling movement of said actuating lever in response to guiding movements of said wheel, whereby the guiding position of said wheel will correspond with the steering position of said lever.

References Cited by the Examiner
UNITED STATES PATENTS

| | | | |
|---|---|---|---|
| 2,549,969 | 4/1951 | Hesemann | 74—471 |
| 2,672,377 | 3/1954 | Werner | 182—2 |
| 2,54,092 | 9/1960 | Trump | 182—2 |
| 2,970,667 | 2/1961 | Bercaw | 182—2 |
| 2,977,769 | 4/1961 | Troche | 182—2 X |
| 3,016,973 | 1/1962 | Williamson | 182—142 X |
| 3,043,395 | 7/1962 | Volkel | 182—2 |
| 3,066,756 | 12/1962 | Broderson | 182—2 |
| 3,091,130 | 5/1963 | Payerle | 74—471 |
| 3,127,952 | 4/1964 | Baerg | 182—2 |

HARRISON R. MOSLEY, *Primary Examiner.*

REINALDO P. MACHADO, *Examiner.*